United States Patent
Dun et al.

(10) Patent No.: US 10,086,279 B2
(45) Date of Patent: *Oct. 2, 2018

(54) CROSS-REALM ZONES FOR INTERACTIVE GAMEPLAY

(71) Applicant: BLIZZARD ENTERTAINMENT, INC., Irvine, CA (US)

(72) Inventors: Alec Dun, Irvine, CA (US); Kurtis McCathern, Placentia, CA (US); Michael Elliott, Trabuco Canyon, CA (US); J. Allen Brack, Lake Forest, CA (US); Tom Chilton, Irvine, CA (US)

(73) Assignee: Blizzard Entertainment, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/977,992

(22) Filed: Dec. 22, 2015

(65) Prior Publication Data
US 2016/0121212 A1    May 5, 2016

Related U.S. Application Data

(63) Continuation of application No. 13/464,871, filed on May 4, 2012, now Pat. No. 9,220,982.

(51) Int. Cl.
*A63F 13/35* (2014.01)
*A63F 13/358* (2014.01)
(Continued)

(52) U.S. Cl.
CPC .............. *A63F 13/35* (2014.09); *A63F 13/12* (2013.01); *A63F 13/358* (2014.09); *A63F 13/30* (2014.09);
(Continued)

(58) Field of Classification Search
CPC ........ A63F 2300/407; A63F 2300/5533; A63F 13/30; A63F 13/35; A63F 13/358; A63F 2300/8082
See application file for complete search history.

(56) References Cited

U.S. PATENT DOCUMENTS 6,570,563 B1 * 5/2003 Honda .................... G06T 19/00
                                                    345/419
7,293,235 B1 * 11/2007 Powers .................... G06T 7/20
                                                    463/1

(Continued)

*Primary Examiner* — William H McCulloch, Jr.
(74) *Attorney, Agent, or Firm* — Hickman Palermo Backer Bingham LLP

(57) ABSTRACT

Methods, computer-readable media, and specially configured machines are described for hosting an instance of a cross-realm zone that manages interaction among characters from different instances of a virtual world in a massively multiplayer online game. Different zones of the virtual world may support different numbers of realms or different combinations of realms, and some zones of the virtual world may remain as single-realm zones. When a character enters a zone, the character may be added to an instance of a cross-realm zone based on the virtual world for which the character is a member. A single cross-realm zone may handle all characters that enter the zone from a subset of realms, but not characters that enter the zone from other realms that are not in the subset of realms. Characters in a cross-realm zone might not have any affiliation or prior social connection or interaction with each other.

18 Claims, 5 Drawing Sheets

(51) Int. Cl.
*A63F 13/30* (2014.01)
*A63F 13/335* (2014.01)

(52) U.S. Cl.
CPC ....... *A63F 13/335* (2014.09); *A63F 2300/407* (2013.01); *A63F 2300/5533* (2013.01); *A63F 2300/5553* (2013.01); *A63F 2300/8082* (2013.01)

(56) References Cited

U.S. PATENT DOCUMENTS

| | | | | |
|---|---|---|---|---|
| 7,927,217 B2 * | 4/2011 | Kimura | .................. | A63F 13/00 463/30 |
| 7,934,996 B2 * | 5/2011 | Aoyama | ................ | A63F 13/10 273/108.1 |
| 8,062,128 B2 * | 11/2011 | Jobe | ........................ | A63F 13/10 273/440 |
| 8,066,571 B2 * | 11/2011 | Koster | .................... | A63F 13/12 463/30 |
| 8,147,339 B1 * | 4/2012 | Perry | ..................... | A63F 13/10 463/31 |
| 8,203,561 B2 * | 6/2012 | Carter | .................... | A63F 13/12 345/474 |
| 8,339,392 B2 * | 12/2012 | Betzler | .................. | A63F 13/12 345/156 |
| 8,345,049 B2 * | 1/2013 | Hamilton, II | ........... | A63F 13/12 345/473 |
| 8,514,249 B2 * | 8/2013 | Hamilton, II | ........... | G06T 19/00 345/428 |
| 8,606,904 B2 * | 12/2013 | Waugaman | ............. | A63F 13/12 709/224 |
| 8,624,903 B2 * | 1/2014 | Hamilton, II | ........... | A63F 13/12 345/418 |
| 8,812,954 B2 * | 8/2014 | Shuster | ................. | A63F 13/358 345/419 |
| 9,138,648 B2 * | 9/2015 | Gavin | .................... | A63F 13/10 |
| 9,220,982 B2 * | 12/2015 | Dun | ........................ | A63F 13/12 |
| 9,233,304 B2 * | 1/2016 | Kurabayashi | ......... | A63F 13/358 |
| 9,675,890 B2 * | 6/2017 | Ahiska | ................... | A63F 13/77 |
| 2004/0143852 A1 * | 7/2004 | Meyers | ................... | A63F 13/12 725/133 |
| 2008/0009352 A1 * | 1/2008 | Aoyama | ................ | A63F 13/10 463/43 |
| 2009/0291761 A1 * | 11/2009 | Hata | ....................... | A63F 13/10 463/42 |
| 2009/0307226 A1 * | 12/2009 | Koster | .................... | A63F 13/12 |
| 2009/0325712 A1 * | 12/2009 | Rance | .................... | A63F 13/12 463/42 |
| 2010/0070859 A1 * | 3/2010 | Shuster | .................. | G06T 19/20 715/706 |
| 2012/0004041 A1 * | 1/2012 | Pereira | .................... | A63F 13/35 463/42 |
| 2012/0059881 A1 * | 3/2012 | Koster | .................... | A63F 13/12 709/204 |
| 2013/0143669 A1 * | 6/2013 | Muller | .................. | A63F 13/795 463/42 |
| 2013/0210528 A1 * | 8/2013 | Pereira | ...................... | A63F 9/24 463/42 |
| 2013/0290106 A1 * | 10/2013 | Bradley | ................ | G06Q 90/20 705/14.64 |
| 2013/0296045 A1 * | 11/2013 | Dun | ........................ | A63F 13/12 463/31 |
| 2013/0344960 A1 * | 12/2013 | Perry | ..................... | A63F 13/12 463/32 |
| 2014/0011595 A1 * | 1/2014 | Muller | .................. | A63F 13/795 463/42 |
| 2014/0031132 A1 * | 1/2014 | Wickett | ................. | A63F 13/10 463/42 |
| 2014/0063004 A1 * | 3/2014 | Hamilton, II | ........... | G06T 19/00 345/419 |
| 2014/0071127 A1 * | 3/2014 | Shuster | ................. | A63F 13/358 345/420 |
| 2015/0126276 A1 * | 5/2015 | Bhogal | .................. | A63F 13/12 463/29 |
| 2016/0121212 A1 * | 5/2016 | Dun | ........................ | A63F 13/12 463/31 |
| 2016/0267721 A1 * | 9/2016 | Hamilton, II | ........... | G06T 19/00 |
| 2017/0287199 A1 * | 10/2017 | Makinen | ................ | G06T 15/005 |
| 2017/0312632 A1 * | 11/2017 | Curley | .................. | A63F 13/537 |

* cited by examiner

CROSS-REALM ZONES FOR INTERACTIVE GAMEPLAY

CROSS-REFERENCE TO RELATED APPLICATIONS; BENEFIT CLAIM

This application claims the benefit as a continuation of application Ser. No. 13/464,871, filed May 4, 2012, the entire contents of which are hereby incorporated by reference for all purposes as if fully set forth herein. The applicants hereby rescind any disclaimer of claim scope in the parent application or the prosecution history thereof and advise the USPTO that the claims in this application may be broader than any claim in the parent application.

FIELD OF THE INVENTION

The present invention relates to managing interactive gameplay.

BACKGROUND

Massively Multiplayer Online Games ("MMOs") allow multiple players to play together simultaneously, usually in a virtual world. MMO role-playing games ("MMORPGs") are popular types of MMOs where player-controlled characters to interact with each other in the virtual world. The player-controlled characters may have goals, jobs, or roles, and go on quests, missions, or even run errands. Most tasks that can be done in the real world can now also be done in MMORPGs.

Many MMORPGs also allow players to perform tasks and assume roles in the virtual world that would not be possible in the real world. For example, characters may wield a battle axe with skill, fly, cast spells, shoot lasers, have mechanical bodyparts, teleport, phase, or use other special powers or abilities. In an example well-known MMORPG, World of Warcraft® ("WoW"), characters move around a two-dimensional or three-dimensional virtual world meeting and interacting with other characters, completing quests, defeating bosses in dungeons, battling other characters, going on massively multiplayer raids, and making friends. WoW has around ten million monthly subscribers, and each subscriber may have multiple characters.

Most MMORPGs have a server-side authentication mechanism that checks a user's identity before the user is allowed to begin controlling his or her character in the virtual world. The user enters his or her information from a client-side device such as a personal computer, a game console, or a mobile device. Once the user is authenticated, many of the games allow the user to select a character and begin a game session in the virtual world. Server(s), referred to herein as "world server(s)," control the interactive gameplay between the character and other characters as the characters move around the virtual world. To support interactive gameplay, world servers may manage visibility of the characters, movement, spells, effects, inventory, items, currency, achievements, stats, non-player character artificial intelligence ("NPC AI"), combat, trade, or textual, verbal, or visual communication such as chat, speak, and yell functions.

The virtual world may include different types of terrain, sky, light, texture, buildings, trees, creatures, objects, non-player characters (NPCs), and characters controlled by other players. Example objects may include items that can be equipped, consumed, stowed, bought, sold, or used by the character, and other entities in the environment that are moveable or non-moveable, moving or non-moving, breakable or non-breakable, visible or non-visible, living or dead, and even entities that inflict damage or restore health, or are enchanting or disenchanting. Equipped items such as armor, shields, helmets, boots, necklaces, gauntlets, and swords or other weapons may boost the ability to dodge, parry, absorb, or reduce damage or critical hit probability of incoming attacks, or boost the damage, critical hit probability, piercing effect, or accuracy of outgoing attacks.

A single instance or version of the virtual world may be hosted by world server software running on one or multiple machines. An operating instance of the virtual world is referred to herein as a "realm," and the operating instance of the virtual world may utilize a world server and other supporting servers (collectively, "realm servers") to facilitate management of the characters in the virtual world. Different machines running world sever software may be designated for handling different zones of the virtual world. High populations of characters may also be split up among multiple instances of the virtual world in order to accommodate the high populations and to reduce the transactional and computational load on each individual instance of the virtual world, potentially resulting in a better quality of gameplay. The multiple instances of the virtual world may be hosted by world server software running on one or multiple machines in one or multiple locations. In one example, different instances of the virtual world are hosted by different machines in different locations of the real world, such as different cities, regions, or zones of the real world. Users may choose to connect to a virtual world instance that is hosted on a machine near the location of the user in the real world.

Multiple instances of the virtual world may be running simultaneously and independently such that characters may interact with other characters in the same instance of the virtual world without being able to see characters in other instances of the virtual world. World server(s) managing a single instance of the virtual world may keep track of character movements and actions in the single instance of the virtual world, without needing to keep track of character movements and actions in other instances of the virtual world. Different instances of the virtual world may be based on the same map or different maps that have at least some corresponding zones or regions. In one example, two maps may have a certain city in common but may otherwise be different. The corresponding city may or may not be identical in the two maps.

A zone is a region or territory of a virtual world that includes many different regions or territories at different locations. Some zones may share boundaries with each other, and others may not. Different characters in an instance of a virtual world may see each other in a zone of the realm regardless of party affiliation. The zone does not need to be re-instantiated for each party in order to support interaction among the characters in the party because the zone has been instantiated once for all of the characters in the realm.

Information about characters that belong to an instance of a virtual world may be stored at a character information server that may be on a same local network and at a same location as a world server for the virtual world. In this manner, the world server and the character information server may communicate without requiring packets to be sent on a third party network, which may be subject to uncontrollable delay. Characters may be tied to a single instance of the virtual world for the life of the character or for individual game sessions between world servers and clients. Alternatively, a character's membership to an instance of the virtual world may be transferred to another instance of the virtual world at the request of the player, and optionally for a fee. Upon a transfer of a character from a first instance of the virtual world to a second instance of the virtual world, information about the character is retrieved from a first character information server that is collocated with and supports the first instance of the virtual world, and sent to a second character information server that is collocated with and supports the second instance of the virtual world.

Many characters level up together as versions of a game are released and as the game becomes popular in new countries, regions, or languages. The game may support a variety of characters that have reached different progress or experience levels such that some instances of the virtual world become imbalanced with too few characters of certain types and/or levels. Splitting up a virtual world into multiple instances is helpful for managing high populations in the virtual world, but splitting up the virtual world into multiple instances may make it more difficult for characters to find other characters that are in similar, unique circumstances. For example, low-level characters may not be able to find other low-level characters if their instance is populated primarily with high-level characters.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
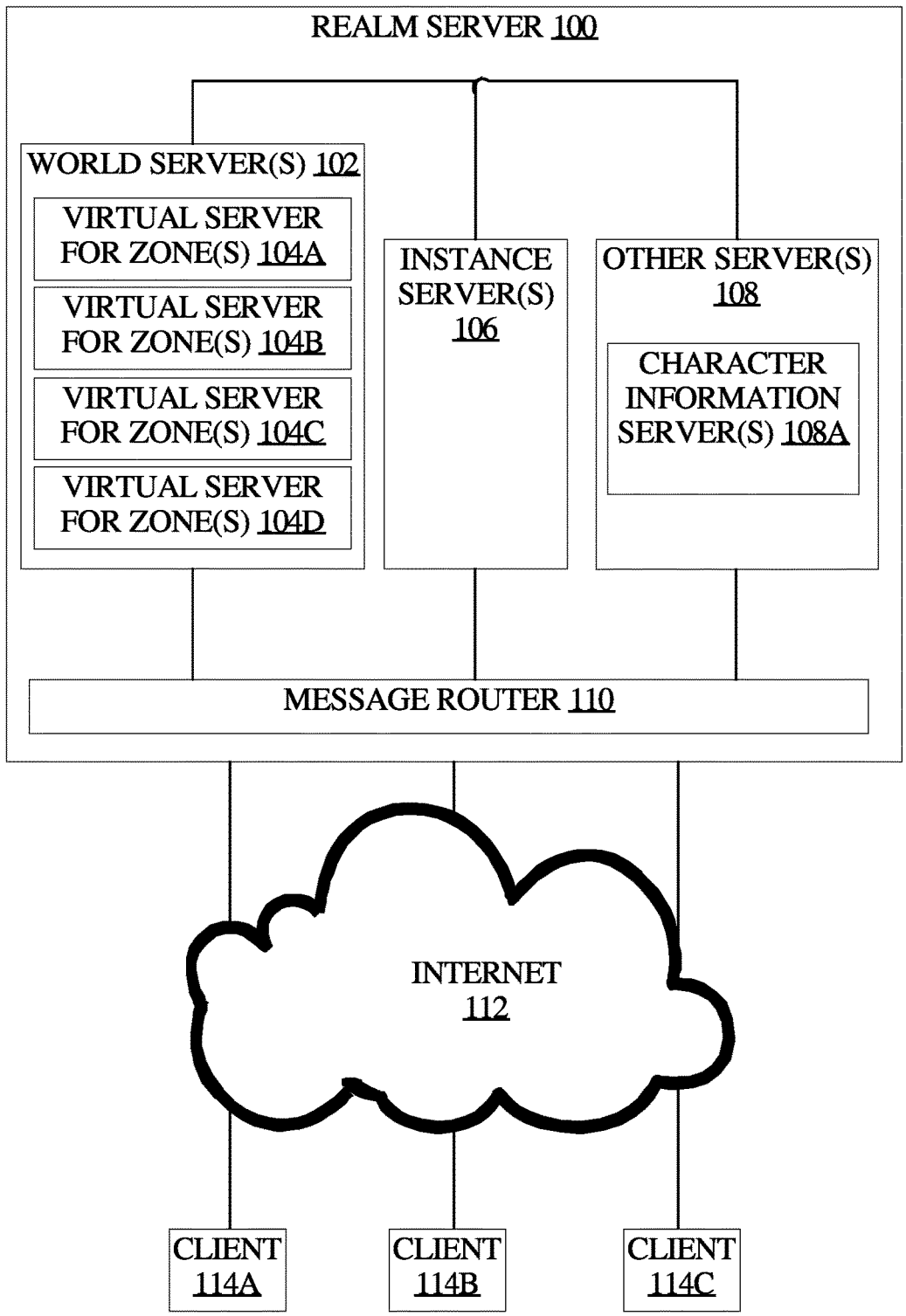
FIG. 1 illustrates an example server-client system for managing interactive gameplay among characters in a virtual world.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Segregation of characters from each other may make a game less entertaining or less interactive, especially for players in unique circumstances, and may result in a decrease in the total player population over time. On the other hand, coalescing characters into a single instance of a virtual world may create such a high computational and transactional load on servers that the quality of the game could be degraded for all players. Techniques are described herein for hosting a cross-realm zone in a virtual world that manages interaction among characters from different realms. Different zones of the virtual world may support different numbers of realms or different combinations of realms, and some zones of the virtual world may remain as single-realm zones. The techniques may be implemented as method(s) that are performed by computing device(s), by executing instructions, stored on one or more non-transitory computer-readable storage media, for performing the method(s), or by computing device(s) specially configured to perform the method(s).

In one embodiment, a zone in a realm may be designated as a cross-realm zone that can be visited by characters from multiple different realms. Even if the population of low-level characters in a given realm is low, the low-level characters may meet up with other low-level characters from other realms in the cross-realm zone.

In one embodiment, a character is added to a cross-realm zone based on a realm for which the character is a member. Computing logic such as a zone transfer engine operating on computing device(s) may receive information that indicates character(s) A is entering a zone. Character(s) A may be a member of instance A of a virtual world. The zone transfer engine determines whether character A is a member of any instance of the virtual world that is assigned to an instance of the zone. A subset of instances of the virtual world, which includes some instance(s) of the virtual world but does not include other instance(s) of the virtual world, may be assigned to a single instance of the zone. Based at least in part on determining that the character A is a member of any instance of the virtual world that is assigned to the instance of the zone, the zone transfer engine adds character A to a group of characters that is in the zone and is managed by server(s) while in the zone. The group of characters may also include character(s) B that are members of instance B of the virtual world.

By adding character A to the group of characters, the zone transfer engine causes character A to enter the same instance of the zone that is managing character B. Character A becomes viewable to character B and vice versa, because, if character A and character B face each other within a threshold proximity in the zone, then character A appears in the view of character B and vice versa. Character A is said to view character B when information about character B is sent to a client-side graphics engine for character A, causing an image of character B to be displayed on a display coupled to the client-side graphics engine. The display would be viewed by the player controlling character A. Character B may be immediately viewed by character A if the characters are within the threshold proximity in the zone and if character A is facing character B. Alternatively, character B may be viewed by character A when the characters come within sight of each other while walking around within the zone.

Character A may also hear character B, and vice versa, and character A may see the effects of the actions of character B, and vice versa. Character A is said to hear character B when information about a sound made by character B is sent to a client-side sound engine for character A, causing the sound made by character B to be played on a speaker or headphones coupled to the client-side sound engine.

Other character(s) in other zone(s) of instance A of the virtual world may not be viewable by other character(s) in other zone(s) of instance B of the virtual world, even if the other zone(s) correspond to each other. For example, if zone X is a cross-realm zone hosted for instances A and B of the virtual world, and zone Y is a zone that is either (i) not a cross-realm zone and exists separately for each virtual world or (ii) is a cross-realm zone that does not host at least one of instances A or B of the virtual world, then characters from instance A that have entered zone Y will not be able to see characters from instance B that have entered zone Y. On the other hand, characters that have entered cross-realm zone X from instances A or B of the virtual world will be able to see and interact with each other.

A character may enter a cross-realm zone by walking in, flying in, swimming in, teleporting in, or by any other manner of transport. If a character is teleported into the cross-realm zone, the character may appear at one of potentially many designated teleport areas within the cross-realm zone. The character may walk into the cross-realm zone by nearing or crossing a boundary of the cross-realm zone as the character exits a neighboring zone, which may or may not be a cross-realm zone.

As a character enters a cross-realm zone, the game server may cause other characters from other realms to phase into or otherwise appear in the character's view. The other characters may phase in by starting as transparent or nearly transparent and gradually becoming more opaque as the character nears the boundary of the cross-realm zone, enters further into the cross-realm zone, or as the other characters are loaded from the server that hosts the cross-realm zone, until the other characters are fully opaque. Alternately, the other characters may suddenly appear in the cross-realm zone. Similarly, to the other characters, the entering character may appear as if the entering character gradually phased into the cross-realm zone. Alternatively, the entering character may appear as if the entering character suddenly teleported into the cross-realm zone.

When a character moves into a cross-realm zone, information about the character is sent from a first server(s) that hosts an instance of the virtual world from which the character is traveling to a second server(s) that hosts the instance of the cross-realm zone. The information may include a location and/or orientation of the character, items that are equipped or stowed on the character, a health or mana level of the character, character stats or traits, or other information about the character. In one embodiment, information may be retrieved from character information server(s) of the character. The character information server(s) for a realm may store and serve information about characters of the realm.

In one embodiment, a character may exit a cross-realm zone into a single realm zone or a zone that supports different realms. When the character exits the cross-realm zone, other characters that were visible may gradually phase out of view or may suddenly disappear. The other characters may phase out of view by starting as fully opaque and gradually becoming more transparent as the character gets closer and closer to the boundary of the cross-realm zone, or gets further and further outside of the cross-realm zone. The other characters may also suddenly disappear or gradually phase out of view as a result of teleporting out of the zone. Similarly, to the other characters, the exiting character may appear as if the exiting character gradually phased out of the cross-realm zone. Alternatively, the exiting character may appear as if the exiting character suddenly disappeared from the cross-realm zone. After the exiting character has exited, the other characters in the cross-realm zone can no longer see the character. Optionally, characters in the cross-realm zone that are from the same virtual world as the character can continue to see the character, but the character disappears from characters that are from a different virtual world.

In one embodiment, server(s) hosting the cross-realm zone in instance A of the virtual world receive information that indicates character(s) A is leaving the cross-realm zone to another zone in instance B of the virtual world. In response, the server(s) of instance A send information about character(s) A to different server(s) hosting the other zone in instance B of the virtual world. The server(s) hosting the cross-realm zone in instance A then remove character(s) A from a group of characters that is in the cross-realm zone. The group of characters may be a stored set or list that is managed by the server(s) hosting the cross-realm zone in instance A.

In one embodiment, server(s) that host zone instance A are in a set of servers that host instance A of a virtual world, and server(s) that host zone instance B are in a set of servers that host instance B of a virtual world. If zone instance A is a cross-realm zone, then zone instance A may include members of instances A and C of the virtual world.

A cross-realm zone may or may not be or include a starting area. If it is a starting area, then characters may immediately see other characters from different realms when they start a new character, re-spawn an existing character, or otherwise choose to start a game session from the starting area.

In one embodiment, server(s) such as game server(s) manage interactive gameplay for active characters from different realms that are in the cross-realm zone. An active character is a character that is currently in use in a server-client game session. The game server(s) host an instance of the zone that is shared by multiple instances of a virtual world. The game server(s) manage interactive gameplay for any active characters that are (i) in the zone and (ii) members of any of the multiple instances of the virtual world for which the instance of the zone is shared. For example, all characters from realms A and B that are entering the zone may be assigned to a particular instance of the zone that is hosted in realm A or realm B. This instance of the zone is said to be a cross-realm zone or a zone that is shared by realm A and realm B. Characters from other realms that are not assigned to the particular instance of the zone may be assigned to a different instance of the zone. In other words, a single cross-realm zone may handle all characters that enter the zone from a subset of realms, but not characters that enter the zone from other realms that are not in the subset of realms.

In one example, the multiple instances of the world for which the instance of the zone is shared includes instance A and instance B. Character(s) A may be members of instance A of the virtual world, and character(s) B may be members of instance B of the virtual world. The game server(s) may manage interactive gameplay by causing character(s) A to be viewable by character(s) B and vice versa. Character A is viewable to character B and vice versa, because, if character A and character B face each other within a threshold proximity in the zone, then character A appears in the view of character B and vice versa. Character A may be immediately viewed by character B if the characters are within the threshold proximity in the zone and if character B is facing character A. Alternatively, character A may be viewed by character B when the characters come within sight of each other while walking around within the zone. Character A may also hear character B, and vice versa, and character A may see the effects of the actions of character B, and vice versa. Other active character(s) in other zone(s) of instance A of the virtual world may not be viewable by other active character(s) in other zone(s) of instance B of the virtual world.

In one embodiment, rather than a character's own realm, a realm of a character's party leader or a character's friend may be used to determine the zone instance to which a character is assigned. This feature may be automatic when a character joins a party, or may be configurable to allow the character to be assigned to a cross-realm zone based on his own realm rather than his party member's realm.

Although the examples involve two characters from different instances of the virtual world, a cross-realm zone may have many different characters from many different instances of the virtual world. Different characters in the cross-realm zone might not have any affiliation with each other. The different characters may include characters from different parties, characters that, prior to entering the cross-realm zone, had never contacted each other by a message or by an invitation to a private instance, characters that are not friends, or any other characters that do not have any prior social interaction, connection, or affiliation with each other. For example, the cross-realm zone may include two, three, four, or more different parties, each of which includes multiple different characters. The parties may not have signed up to battle each other or quest together—their only connection could be that they happen to be in the same zone.

In one embodiment, a virtual world has cross realm zone(s) and single realm zone(s). If the virtual world has multiple cross-realm zones, same or different numbers of realms and same or different combinations of realms may be assigned to each zone. For example, a zone X in instance A of the virtual world may be a cross-realm zone for characters in instances A, B, and C of the virtual world. Zone Y in instance A of the virtual world may be a cross-realm zone for characters in instances A, B, D, and E of the virtual world. In the example, zone Y in instance C of the virtual world may be a single-realm zone for characters in instance C, and zone X in instance E of the virtual world may be a cross-realm zone for characters in instances D and E of the virtual world. In the example, characters in zone X in instance E of the virtual world are not viewable by and are not able to view characters in zone X in instance A of the virtual world. Similarly, characters in zone Y in instance C of the virtual world are not viewable by and are not able to view characters in zone Y in instance A of the virtual world.

In one embodiment, an instance of a cross-realm zone includes objects that are viewable by any characters that are in the instance of the cross-realm zone but not by any characters that are in a different instance of the zone. Although the terrain and other environment characteristics in different instances of a cross-realm zone may be the same or similar, and even some objects such as non-moveable objects in the different instances of the cross-realm zone may be the same or similar, there may be some objects that are different in the different instances of the cross-realm zone. For example, objects may be dropped by characters, created or destroyed by characters, or moved around by characters in one instance of a cross-realm zone. In another instance of the zone, characters may not have seen that the objects were dropped, created, destroyed, or moved, or may not even see the objects at all.

FIG. 1 illustrates an example server-client system for managing interactive gameplay among characters in a virtual world. Realm server 100 may be one of many realm servers that are communicating with different clients to support game sessions in virtual worlds. Realm server 100 includes world server(s) 102 for managing interactive gameplay in an instance of the virtual world. World server(s) 102 may include many virtual servers 104A-D. Each virtual server 104 may be responsible for a different zone in the virtual world. One or more of the virtual servers 104s may host interactive gameplay for a cross-realm zone of the virtual world. The cross-realm zone may include characters from different realms. The virtual servers 104s are in communication with each other to handle the passing off of characters moving between zones, and with other instance server(s) 106, other server(s) 108, and message router 110. World server(s) 102 may also include a spawn server for managing the spawning of creatures in the virtual world, and a global server for managing information that is global among virtual servers 104s.

Instance server(s) 106 manage interactive gameplay for characters that have joined private instances. For example, characters playing in a dungeon may be managed by a server that is separate from world server(s) 102. Other server(s) 108 may include character information server(s) 108A that manage the storage and retrieval of character-specific information. Another example server is a chat server that manages communication of messages between players.

Message router 110 handles client incoming client messages and outgoing server messages in an efficient manner. Message router 110 may send client messages to the appropriate server-side component without exposing the existence of the server-side component to the client. Message router 110 may also forward server-side messages to the client as if the realm server 100 was hosted on a single machine.

Figure 3:
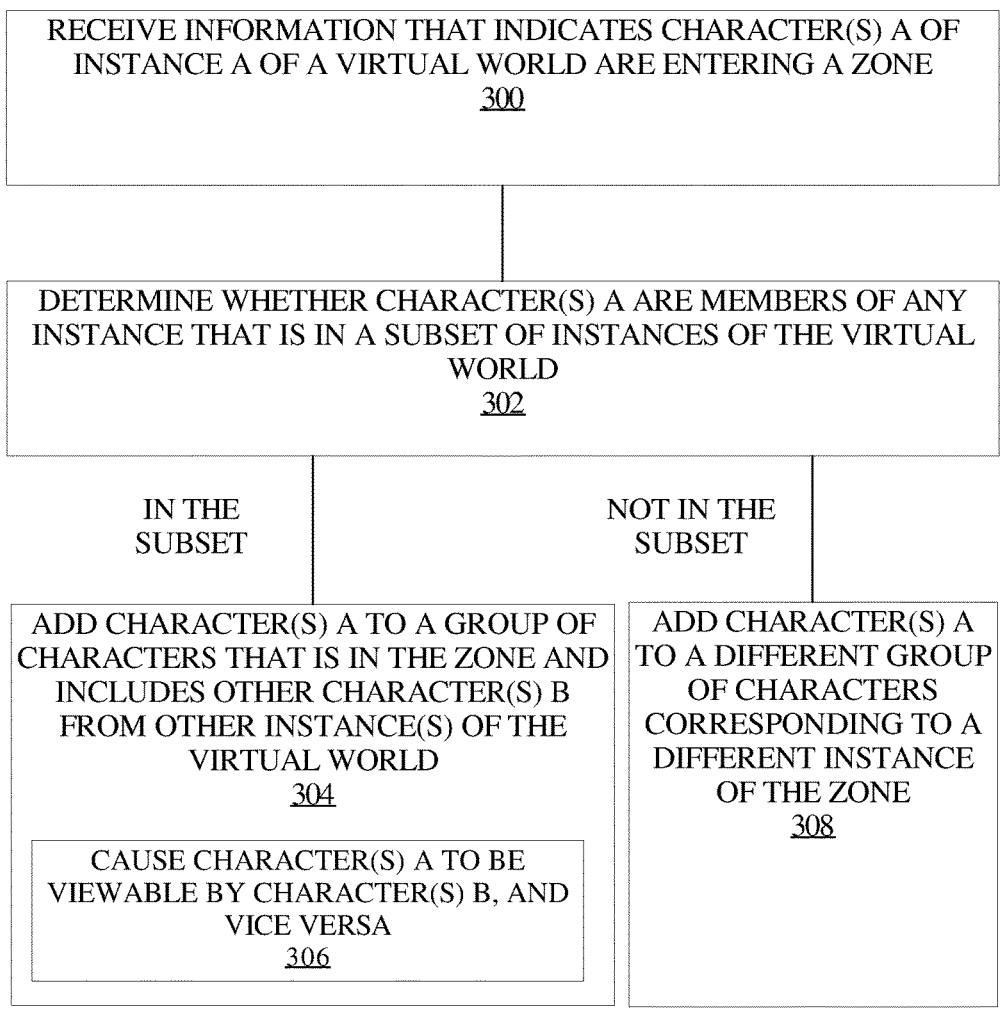
FIG. 3 illustrates an example process for adding characters to a cross-realm zone.

FIG. 3 illustrates an example process for adding characters to a cross-realm zone. In step 300, a server receives information that indicates character(s) A of an instance of a virtual world are entering a zone. In step 302, the server determines whether character(s) A are members of any instance that is in a subset of instances of the virtual world. If character(s) A are members of an instance in the subset, the server adds character(s) A to a group of characters that is in the zone in step 304. The group of character(s) includes other character(s) B from other instance(s) of the virtual world. Step 304 includes a sub-step 306 of causing character(s) A to be viewable by character(s) B, and vice versa, in an instance of the zone of the virtual world.

If character(s) A are not members of an instance in the subset that is managed by the instance of the virtual world, another server may add character(s) A to a different group of characters corresponding to a different instance of the zone in a different virtual world in step 308.

Figure 4:
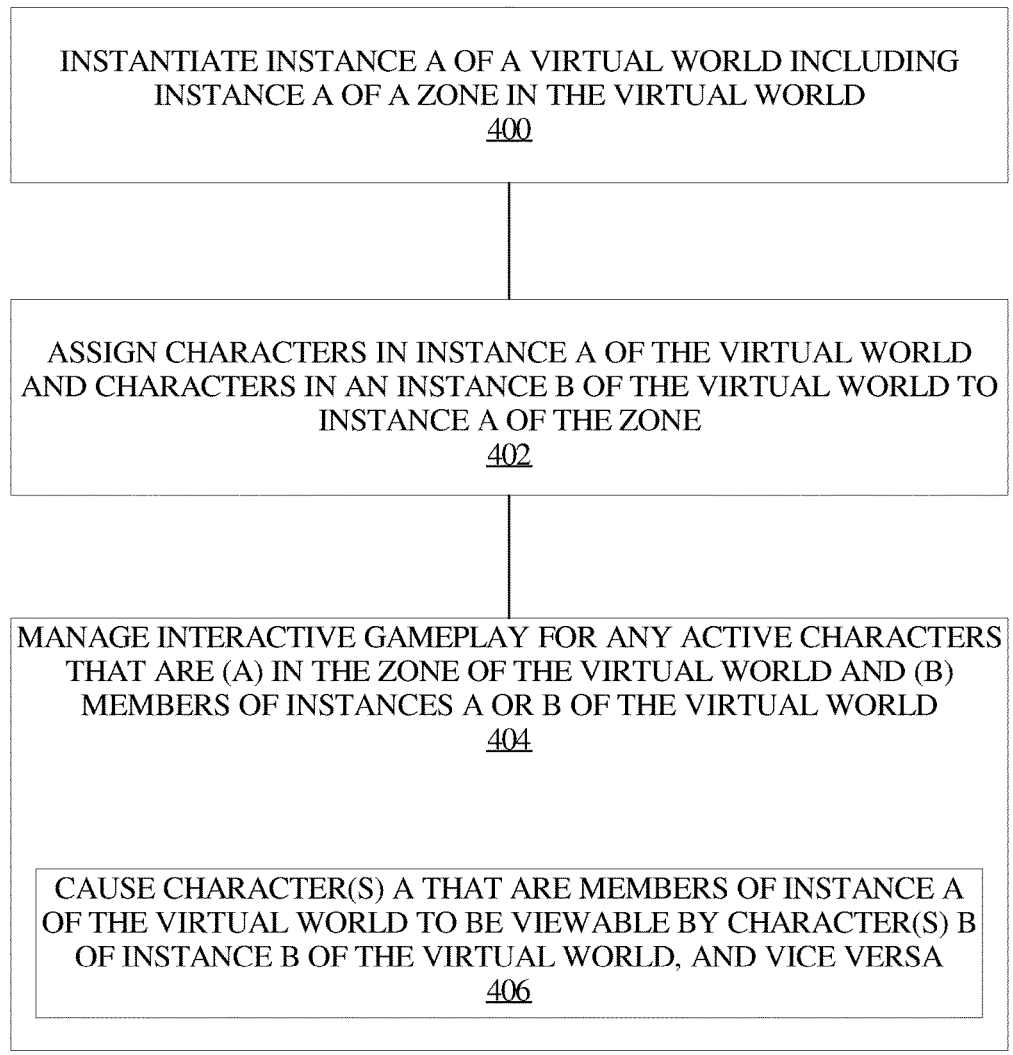
FIG. 4 illustrates an example process for managing interactive gameplay among characters in an instance of a cross-realm zone.

FIG. 4 illustrates an example process for managing interactive gameplay among characters in an instance of a cross-realm zone. In step 400, a server instantiates an instance A of a virtual world including instance A of a zone in the virtual world. Characters of instances A and B of the virtual world may then be assigned to instance A of the zone in step 402. In step 404, the server manages interactive gameplay for any or all active characters that are (a) in the zone of the virtual world and (b) members of instances A or B of the virtual world. Step 404 may include a sub-step 406 of causing character(s) A that are in the zone and members of instance A of the virtual world to be viewable by character(s) B that are in the zone and members of instance B of the virtual world, and vice versa.

Joining a Private Instance from an Instance of a Cross-Realm Zone

Characters in same or different realms may create a private instance of a dungeon or battleground for a size-limited group of characters. Characters may enter the private instance when a player controlling the character selects a queue, invites other players or is invited by other players to a party, raid, or quest, by walking the character through a door to start a new private instance alone, or by walking the character through a door with other party members to start a new private instance with the party, or by selecting to be automatically matched with other characters that are also waiting to play the private instance. A character entering a private instance joins a party with common goal(s) such as killing NPC bosses in a dungeon instance or defeating other characters in a battleground instance. A player controls who is and is not in his party.

Two characters entering a private instance together in the same realm would be assigned to different instances unless the two characters were previously affiliated by being members of the same party. If characters enter a private instance from two different realms, the characters in the different realms do not get to see each other before the characters enter the private instance, after the private instance has loaded.

Characters may affiliate with parties or raids either by invitation or by a matching tool. If a player selects to be matched using the matching tool, the matching tool may automatically choose other party members or raid members to accompany the player's character on a quest from among other characters that are also requesting to start the same quest.

Unlike zones, multiple private instances for the same quest may exist in a single virtual world. The creation and destruction of private instances is controlled by the players who choose whether to start new quests and, if so, which new quests to start or join. For example, a single virtual world may have multiple instances of the same dungeon that exist simultaneously, each instance involving different sets of players that are interacting to defeat the same bosses.

In one embodiment, characters in a cross-realm zone may join a dungeon or battleground together while they are in view of each other even if the characters are from different virtual worlds. The game server may receive information that indicates character(s) A from instance A of the virtual world and character(s) B from instance B of the virtual world are entering a private instance from within the same instance of the cross-realm zone. The instance of the cross-realm zone may be hosted at the same site as instance A of the virtual world or instance B of the virtual world, or at some other site. In response to receiving the information that indicates that character(s) A and character(s) B are entering the private instance, the characters may be added to the private instance and temporarily removed from the cross-realm zone during the quest. As the characters exit the cross-realm zone to start the quest, the characters disappear from other characters that are in the cross-realm zone, such as other characters from instances A and B of the virtual world. After the quest, the characters may automatically return to the cross-realm zone, or they may return to another zone of the players' choice.

Pre-Loading Information to the Client Across Realms

In one embodiment, information is pre-loaded to the client of an entering or potentially entering character as the character approaches a cross-realm zone. For example, world server(s) A hosting a neighboring zone A that includes the client's character may detect that the character is within a threshold distance (in a buffer region) of a cross-realm zone hosted by world server(s) B. For example, the threshold distance may be greater than, less than, or equal to, but near what would be the typical eyesight distance for the character. Alternatively, the client may detect that the character has entered the buffer region that extends a threshold distance outside of the cross-realm zone. In response to detecting that the character is in the buffer region, the world server(s) A or the client sends a request to world server(s) B for information about other character(s) and object(s) in the cross-realm zone. The request may also include information about the location of the entering character such that the entering character in the buffer region may be viewed by the other characters in the cross-realm zone even before the entering character has entered the cross-realm zone. World server(s) B send, back to the client or to world server(s) A, information about the other character(s) and object(s) in the cross-realm zone. If sent to world server(s) B, then world server(s) B may relay this information to the client so that the other character(s) in the cross-realm zone may be viewed by the character while the character is in the buffer region even before the client has entered the cross-realm zone.

In one embodiment, a world server receives information A, such as information in the form of a location update message, that indicates character(s) A are approaching the cross-realm zone from instance A of the virtual world. The world server may be among a set of servers that manage instance B of the virtual world. In response to receiving the information A, the world server sends, to a server that manages interactive gameplay for the instance A of the virtual world, information B, such as a location update message, about other characters in the zone. These other characters may include characters that are in the zone from instance B of the virtual world.

In one embodiment, when a character is within a threshold distance of, or within sight or earshot of a cross-realm zone, a client may load textures, surfaces, common objects, or other environment characteristics from a client's version of the zone or the character's home realm's instance of the zone, even if that instance would not host the cross-realm zone for that character. Characters and zone-instance-specific objects such as dropped items and corpses may be loaded from a server that is predicted to host the cross-realm zone for the character. The characters and zone-instance-specific objects may gradually appear in the cross-realm zone as they are loaded, but the character will not be impeded from movement if the basic environment characteristics have already been loaded. In one example, information about characters and zone-instance-specific objects that are nearer a character are loaded before characters and zone-instance-specific objects that are further away from the character.

In one embodiment, a character approaching a cross-realm zone cannot view or interact with other characters and zone-instance-specific objects in the cross-realm zone. Information about the other characters and zone-instance-specific objects may be loaded after the character enters the cross-realm zone. In this embodiment, the cross-realm zone may appear empty or as a virtual bubble in the virtual world before the character enters the cross-realm zone, and other characters and zone-instance-specific objects may appear when the character enters the cross-realm zone or even after the character has entered the cross-realm zone.

In another embodiment, a character approaching a cross-realm zone can view or interact with other characters and zone-instance-specific objects in the cross-realm zone once the character within a threshold distance or within sight of the cross-realm zone. The other characters, zone-instance-specific objects, and their current attributes may be dynamically mirrored or pre-loaded from a server hosting the cross-realm zone when the character enters a buffer area that is within a threshold distance from the cross-realm zone. Similarly, information about the character approaching the cross-realm zone may be dynamically mirrored or pre-loaded to the server hosting the cross-realm zone. The buffer area may be bigger, smaller, or the same size as the distance at which objects in the cross-realm zone would be within sight of the character as if there was no zone boundary.

A character may enter a cross-realm zone by crossing an invisible boundary in the virtual world without requiring any explicit selection by the user controlling the character to change realms. The character may continue to walk into the cross-realm zone as objects and characters in the zone are loaded from either the same server that hosts the character's instance or from a new server that hosts the cross-realm zone but does not host the character's instance.

When characters enter or near the boundary of a cross-realm zone in a direction towards the cross-realm zone, the characters may phase into the cross-realm zone by gradually becoming less transparent. When characters leave or near the boundary of a cross-realm zone in a direction away from the cross-realm zone, the characters may phase out of the cross-realm zone by gradually becoming more transparent.

Splitting and Merging Instances of Cross-Realm Zones

An instance of a cross-realm zone may be split into multiple instances of the cross-realm zone, each instance serving different combinations of realms. In one example, a character that was in an instance of the cross-realm zone before the split may remain in the same instance of the cross-realm zone after the split, even if the realm of the character is not in the subset of realms that are being served by that instance of the cross-realm zone. In this embodiment, the instance of the cross-realm zone may have characters from realms that are no longer being assigned to that instance when they enter the zone in the virtual world. In another example, if the characters are from a different realm than the subset of realms that the instance of the cross-realm zone is serving, those characters may be booted from the instance of the cross-realm zone or moved to the instance to which their realm is assigned, immediately or after a period of time has passed, when the cross-realm zone is split.

In one embodiment, instance A of a cross-realm zone is hosted for characters from instances A, B, and C of the virtual world. Server(s) may then detect that group A of characters that are in instance A of the zone includes a threshold number of characters, such as 500 characters. In response, the server(s) creates instance B of the zone and re-assigning instance(s) of the virtual world from instance A of the zone to instance B of the zone. Re-assignment may include removing instance B of the virtual world from the subset of instances of the virtual world that are supported by instance A of the zone. Instance B of the virtual world may then be added to a subset of instances of the virtual world that are supported by instance B of the zone. After splitting the cross-realm zone, resulting instances of the zone may also be cross-realm zones or single-realm zones.

After the cross-realm zone is split, characters may be assigned to instances A and B of the zone according to the realms currently assigned to that instance of the zone. In the example, characters from instance B of the virtual world that are entering the zone may be assigned to instance B of the zone rather than instance A of the zone because realm B is no longer assigned to instance B of the zone. After the split, characters in instance B of the zone are not viewable by and are not able to view characters in instance A of the zone, and vice versa.

Separate instances of a zone may also be merged into a single instance of the zone that serves the realms that were previously served by the separate instances of the zone. In one example, characters that were in the separate instances of the zone before the merge may remain in the merged instance of the zone, and these characters may be able to view and interact with each other rather than being segregated.

In one embodiment, instance A of the zone is hosted for characters from instance A of the virtual world, and instance B of the zone is hosted for characters from instances B and C of the virtual world. Server(s) may then detect that group A of characters that are in instance A of the zone and group B of characters that are in instance B of the zone, optionally aggregated, include fewer than a threshold number of characters, such as 100 characters. In response, the separate instances of the zone are merged by adding group B of characters to group A of characters, adding instances B and C to the instances that are served by instance A of the zone, and stopping instance B of the zone. Instance A of the zone may be running on a set of servers that also run instance A of the virtual world, and instance B of the zone may be stopped on a set of servers that also run instance B of the virtual world. In the example, an instance of the zone might not be running at all on instance C of the virtual world.

In one embodiment, the subset of realms that are served by a cross-realm zone is determined using a tree. The tree may have different groups of realms to be assigned to different zone instances at different levels of the tree, and the level of the tree on a branch may be selected based on how many characters are in the zone for realms that are referenced in the branch.

In one embodiment, a zone instance is hosted by a set of servers that hosts one of the subset of instances of the virtual world. For example, if a zone instance is set up for 9 realms, then a set of servers hosting one of the 9 realms, such as a $6^{th}$ realm, is chosen as the set of servers to host the instance of the realm. In this manner, characters in the $6^{th}$ realm would not need to change realms when entering the zone. The host of the zone instance may be selected in any deterministic manner. In an example, the zone may be assigned a number, such as 13, and the server may be selected by taking the zone number modulo the number of realms assigned to the zone instance. In the example, 13 mod 9 is 4, and the set of servers serving the $4^{th}$ realm could be chosen as the set of servers to host the instance of the zone. Different zones may be assigned different numbers to promote distribution of cross-realm zones among different sets of servers that host the different realms.

In another example, the set of servers may be chosen based on the realm that has the most characters in the zone, or the most activity in the zone. For example, realm 7 may have more characters in the zone than any other realm. In the example, the set of servers hosting realm 7 may be selected as the set of servers to host the instance of the zone.

Figure 2:
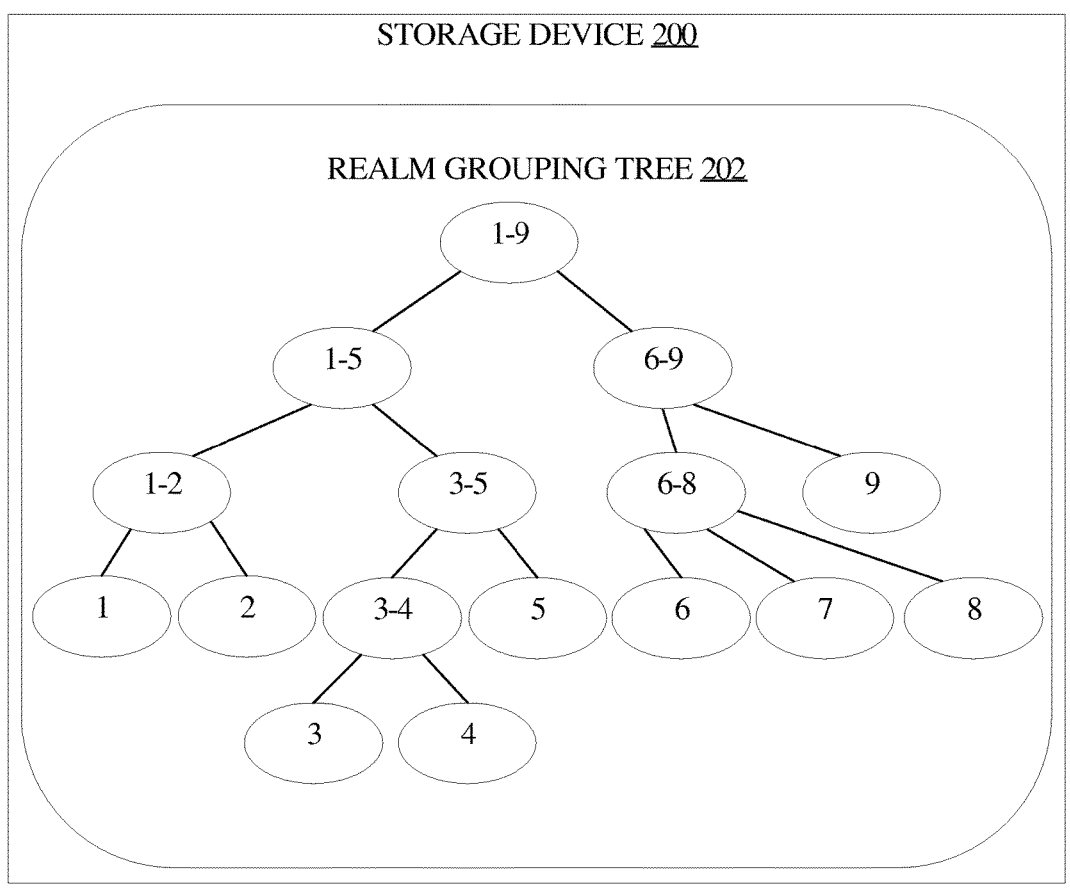
FIG. 2 illustrates an example of a stored realm grouping tree for determining which realms are assigned to which instances of a zone.

FIG. 2 illustrates an example of a realm grouping tree 202 stored on a storage device 200 such as a hard drive or memory module. The realm grouping tree 202 facilitates a determination as to the realms that are assigned to different instances of a zone. If the top level of grouping tree 202 is active, then realms 1-9 are all grouped together in the same cross-realm instance of the zone. At the second level, realms 1-5 are grouped together on one cross-realm instance of the zone, and realms 6-9 are grouped together on another cross-realm instance of the zone.

At any given time, the realm on which a cross-realm zone is being handled may be determined by checking the active levels in the tree on a branch of interest to determine a subset of realms that are being handled in a single cross-realm zone. Then, a deterministic formula may be applied to the subset of realms to determine which realm of the subset of realms is hosting the instance of the zone for the subset.

Alternatively, servers from realms in the subset of realms may coordinate with each other to determine which realm owns the cross-realm zone, and a result of this determination may be stored or updated on each of the realms. In either technique, once the owner has been determined or updated, the owner of a cross-realm zone may be determined by checking information stored at the realm without requiring further communication with the other realms.

Changes in grouping may occur by traversing the tree upwardly or downwardly on any branch. In the example, if realms 1-5 become too crowded, a new instance of the cross-realm zone may be started such that one instance of the zone handles realms 1-2 and another instance of the zone handles realms 3-5. Similarly, if the instance handling the cross-realm zone for realms 1-2 becomes too crowded, another instance of the zone may be started such that one instance of the zone handles a single realm 1 and another instance of the zone handles a single realm 2. Other groupings are also possible, such as, on the right side of the tree, where one instance of the zone handles multiple realms 6-8 while another instance of the zone handles a single realm 9.

Handling Corpses and Other Objects in a Cross-Realm Zone

In one embodiment, multiple copies of a corpse or other object may exist in different cross-realm zones such that any character that should be able to see or interact with the corpse or other object is actually able to see and interact with an instance of the corpse or other object. The corpse may be of the character himself, if the character is a ghost, or of another character such as a party member. In one example, if a character leaves a zone and re-enters the zone, the character may still see the corpse (such as his own corpse or a party member's corpse) even if the character has been assigned to a different cross-realm zone upon re-entry.

In one embodiment, a corpse or other object may be deleted upon the expiry of a timeout for which the corpse or other object should no longer be relevant. For example, the corpse may be deleted a week after the character died. If the character has not retrieved his corpse by that time, the character may be teleported to a starting area.

Handling Chat in a Cross-Realm Zone

In one embodiment, a chat server sends messages to clients that have characters in a given realm or in a given zone. If a character has a membership with one realm but is in a cross-realm zone hosted at another realm, the character may or may not receive notifications that are directed to the character's membership realm and/or the other realm. Different systems may be configured to notify or not notify the character in this scenario. If configured to notify the character, the chat server may forward, redirect, or appropriately direct messages such that the character receives the messages. In one embodiment, the chat server uses a deterministic function or stored information to determine which realm is currently hosting a zone instance and directs the message to the set of servers that host that realm. This may be the same function that was used to assign the zone instance to the realm. The chat servers may also be configured to avoid sending duplicate messages when a message to a player would be triggered by more than one realm.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
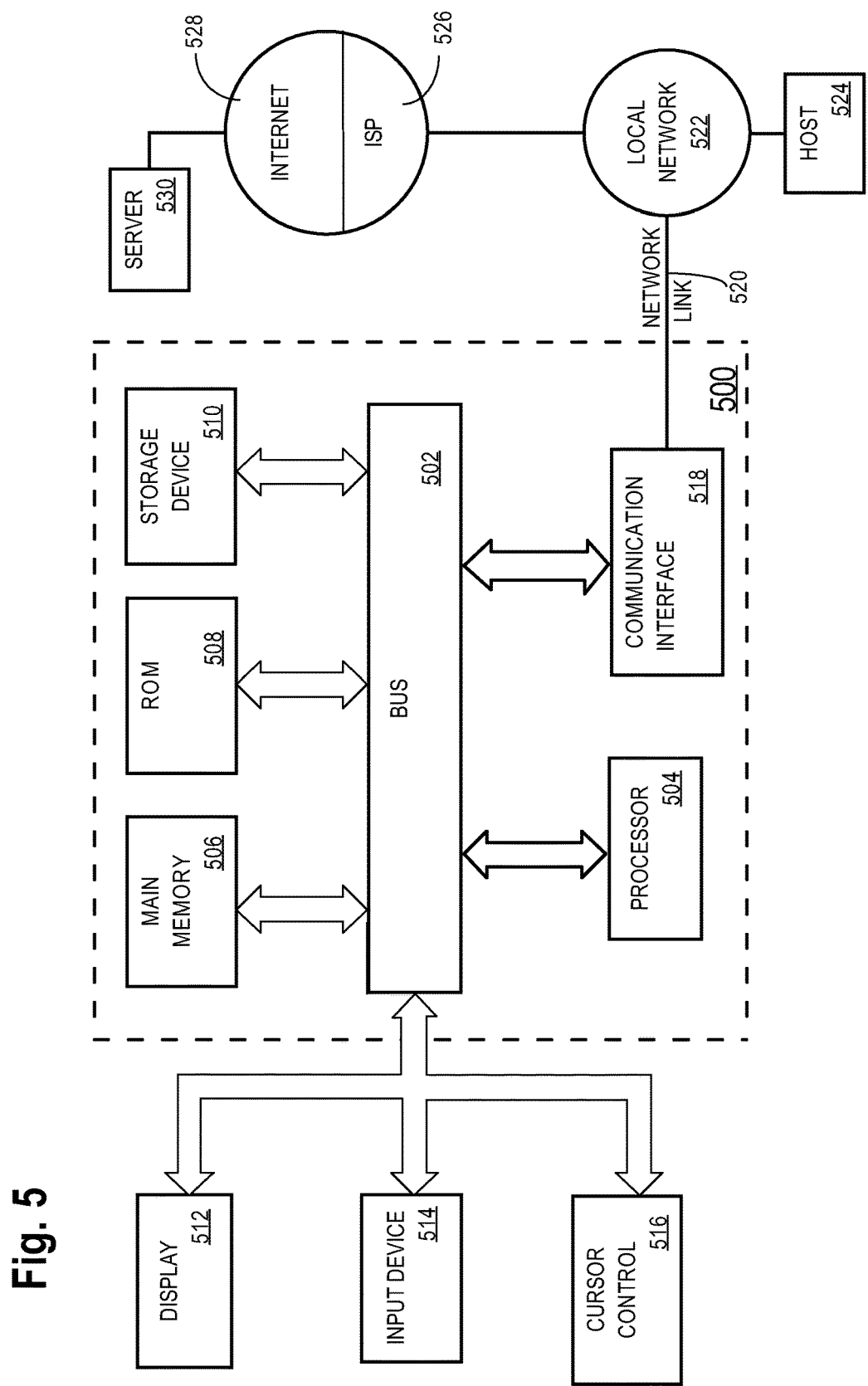
FIG. 5 illustrates an example computer system upon which various server-side or client-side techniques may be implemented.

For example, FIG. 5 is a block diagram that illustrates a computer system 500 upon which an embodiment of the invention may be implemented. In server architecture, some of the components of FIG. 5 may be instantiated multiple times in a cluster or rack, such as processor 504 and main memory 506 or even computer system 500 as a whole; whereas, other components of FIG. 5 may not be instantiated at all in server architecture, such as display 512 and input device 514. In client architecture, a user may manipulate input device 514 to control a character, and the character's view may be presented on display 512. Also in client architecture, processor 504 and memory 506 may be instantiated twice, once for computational processing and once for graphics processing. The graphics processing is often handled by a high-end graphics card, which is not shown in the example of FIG. 5.

Example computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

As used herein, the terms "first," "second," "third," and "particular" are used as naming conventions to distinguish different entities, such as different instances, objects, characters, or players, from each other, so that these different entities may be referenced after they have been introduced. The use of these terms does not imply an ordering or any other characteristic of the entities.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   determining that a first character within a first instance of a first zone of a virtual world has entered within a threshold distance of a second zone of the virtual world;
   wherein the first instance of the first zone is managed by a first server and the second zone is managed by a plurality of servers that each manage a respective instance of the second zone;
   wherein the plurality of servers includes a second server that is different than the first server and manages a first instance of the second zone;
   wherein the plurality of servers includes a third server that is different than the first server and the second server and manages a second instance of the second zone;
   wherein the first character is controlled by a first client;
   wherein the threshold distance is not zero;
   wherein a particular object exists in the first instance of the second zone and the particular object does not exist in the second instance of the second zone;
   wherein a second particular object exists in the second instance of the second zone and the second particular object does not exist in the first instance of the second zone;
   in response to determining that the first character has entered within the threshold distance of the second zone, determining that the first character will be placed in the first instance of the second zone;

in response to determining that the first character will be placed in the first instance of the second zone, sending a request to the second server;

wherein the request includes locational information of the first character;

in response to receiving the request, while the first character is within the threshold distance of the second zone but not yet within the second zone, the second server:

making the first character visible to characters within the first instance of the second zone based on the locational information of the first character, and causing preloading information to be provided to the first client, wherein the preloading information identifies one or more of:

characters currently within the first instance of the second zone, or objects currently within the first instance of the second zone;

wherein the preloading information identifies the particular object, but not the second particular object;

wherein the method is performed by one or more computing devices.

2. The method of claim 1, wherein sending the request to the second server for the preloading information is performed by the first client.

3. The method of claim 1, wherein:

sending the request to the second server for the preloading information is performed by the first server; and the method further comprises the first server relaying the preloading information to the first client.

4. The method of claim 1, further comprising:

in response to a determination that the first character has entered the second zone of the virtual world, transferring management of the first character from the first server to the second server.

5. The method of claim 1, wherein using the preloading information includes causing the first client to load one or more player characters that are currently in the second zone.

6. The method of claim 1, wherein the preloading information includes at least positional information for one or more of: the characters or the objects within the second zone.

7. The method of claim 1, wherein using the preloading information includes causing the first client to load one or more of: textures, surfaces, common objects, environmental characteristics, or non-player characters.

8. The method of claim 1 further comprising:

in response to receiving the preloading information, using the preloading information to cause the first client to load, while the first character is within the threshold distance of the second zone but not yet within the second zone, one or more of:

the characters currently within the second zone, or the objects within the second zone currently within the second zone;

wherein receiving the preloading information causes the first client to load the particular object, but not the second particular object; and causing characters or objects, currently within the second zone, that are closer to the first character to be loaded before characters or objects, currently within the second zone, that are further from the first character.

9. A method comprising:

determining that a first character within a first instance of a first zone of a virtual world has entered within a threshold distance of a second zone of the virtual world;

wherein the virtual world includes a plurality of zones;

maintaining a plurality of realms of the virtual world, wherein each realm of the plurality of realms includes a distinct instance of each zone of the plurality of zones;

wherein each realm of the plurality of realms is managed by a distinct set of servers;

wherein the first instance of the first zone belongs to a first realm managed by a first set of servers;

wherein the first character belongs to the first realm;

wherein a first instance of the second zone belongs to a second realm managed by a second set of servers;

wherein a second instance of the second zone belongs to a third realm managed by a third set of servers;

wherein the first character is controlled by a first client;

wherein the threshold distance is not zero;

wherein the first instance of the second zone includes one or more characters from one or more other realms that differ from the first realm;

wherein a particular object exists in the first instance of the second zone and the particular object does not exist in the second instance of the second zone;

wherein a second particular object exists in the second instance of the second zone and the second particular object does not exist in the first instance of the second zone;

in response to determining that the first character has entered within the threshold distance of the second zone, determining that the first character will be placed in the first instance of the second zone;

in response to determining that the first character will be placed in the first instance of the second zone, sending a request to the second set of servers;

in response to the request, the second set of servers causing preloading information to be provided to the first client, wherein the preloading information identifies one or more of:

characters currently within the first instance of the second zone, or objects currently within the first instance of the second zone;

wherein the preloading information identifies the particular object, but not the second particular object;

in response to receiving the preloading information, using the preloading information to cause the first client to load, while the first character is within the threshold distance of the second zone but not yet within the second zone, one or more of:

the characters currently within the second zone, or the objects within the second zone currently within the second zone;

wherein receiving the preloading information causes the first client to load the particular object, but not the second particular object;

wherein the method is performed by one or more computing devices.

10. One or more non-transitory computer-readable storage mediums storing one or more instructions which, when executed by one or more processors, cause the one or more processors to perform:

determining that a first character within a first instance of a first zone of a virtual world has entered within a threshold distance of a second zone of the virtual world;

wherein the first instance of the first zone is managed by a first server and the second zone is managed by a plurality of servers that each manage a respective instance of the second zone;

wherein the plurality of servers includes a second server that is different than the first server and manages a first instance of the second zone;

wherein the plurality of servers includes a third server that is different than the first server and the second server and manages a second instance of the second zone;

wherein the first character is controlled by a first client;

wherein the threshold distance is not zero;

wherein a particular object exists in the first instance of the second zone and the particular object does not exist in the second instance of the second zone;

wherein a second particular object exists in the second instance of the second zone and the second particular object does not exist in the first instance of the second zone;

in response to determining that the first character has entered within the threshold distance of the second zone, determining that the first character will be placed in the first instance of the second zone;

in response to determining that the first character will be placed in the first instance of the second zone, sending a request to the second server;

wherein the request includes locational information of the first character;

in response to receiving the request, while the first character is within the threshold distance of the second zone but not yet within the second zone, the second server:
making the first character visible to characters within the first instance of the second zone based on the locational information of the first character, and
causing preloading information to be provided to the first client, wherein the preloading information identifies one or more of:
characters currently within the first instance of the second zone, or
objects currently within the first instance of the second zone;
wherein the preloading information identifies the particular object, but not the second particular object.

11. The one or more non-transitory computer-readable storage mediums of claim 10, wherein sending the request to the second server for the preloading information is performed by the first client.

12. The one or more non-transitory computer-readable storage mediums of claim 10, wherein:
sending the request to the second server for the preloading information is performed by the first server; and the one or more instructions, when executed by the one or more processors, further cause the first server to relay the preloading information to the first client.

13. The one or more non-transitory computer-readable storage mediums of claim 10, wherein the one or more instructions, when executed by the one or more processors, cause the one or more processors to further perform:
in response to a determination that the first character has entered the second zone of the virtual world, transferring management of the first character from the first server to the second server.

14. The one or more non-transitory computer-readable storage mediums of claim 10, wherein:
the first character belongs to a first realm,
the first zone is an instance that belongs to the first realm, and
the second zone includes one or more characters from one or more other realms that differ from the first realm.

15. The one or more non-transitory computer-readable storage mediums of claim 10, wherein using the preloading information includes causing the first client to load one or more player characters that are currently in the second zone.

16. The one or more non-transitory computer-readable storage mediums of claim 10, wherein the preloading information includes at least positional information for one or more of: the characters or the objects within the second zone.

17. The one or more non-transitory computer-readable storage mediums of claim 10, wherein using the preloading information includes causing the first client to load one or more of: textures, surfaces, common objects, environmental characteristics, or non-player characters.

18. The one or more non-transitory computer-readable storage mediums of claim 10, wherein the one or more instructions, when executed by the one or more processors, cause the one or more processors to further perform:
in response to receiving the preloading information, using the preloading information to cause the first client to load, while the first character is within the threshold distance of the second zone but not yet within the second zone, one or more of:
the characters currently within the second zone, or
the objects within the second zone currently within the second zone;
wherein receiving the preloading information causes the first client to load the particular object, but not the second particular object; and
causing characters or objects, currently within the second zone, that are closer to the first character to be loaded before characters or objects, currently within the second zone, that are further from the first character.

* * * * *